(12) United States Patent
Jumpertz et al.

(10) Patent No.: US 12,491,848 B2
(45) Date of Patent: Dec. 9, 2025

(54) METHOD FOR A DRIVER ASSISTANCE SYSTEM FOR RELEASING AN ELECTRO-HYDRAULIC PARKING BRAKE

(71) Applicant: ZF Active Safety GmbH, Koblenz (DE)

(72) Inventors: Matthias Jumpertz, Sinzig (DE); Ralf Kinder, Kadenbach (DE)

( * ) Notice: Subject to any disclaimer, the term of this patent is extended or adjusted under 35 U.S.C. 154(b) by 137 days.

(21) Appl. No.: 18/354,796

(22) Filed: Jul. 19, 2023

(65) Prior Publication Data
US 2024/0025381 A1   Jan. 25, 2024

(30) Foreign Application Priority Data
Jul. 19, 2022   (DE) .................. 102022118072.7

(51) Int. Cl.
*B60T 8/17* (2006.01)
*B60T 13/58* (2006.01)
*B60T 13/68* (2006.01)

(52) U.S. Cl.
CPC .............. *B60T 8/17* (2013.01); *B60T 13/588* (2013.01); *B60T 13/686* (2013.01); *B60T 2201/12* (2013.01); *B60T 2220/00* (2013.01); *B60T 2250/00* (2013.01); *B60T 2270/10* (2013.01); *B60T 2270/30* (2013.01)

(58) Field of Classification Search
CPC ........ B60T 8/17; B60T 13/588; B60T 13/686; B60T 2201/12; B60T 2220/00; B60T 2250/00; B60T 2270/10; B60T 2270/30; B60T 7/122; B60T 13/662; B60T 8/171; B60T 8/172; B60T 8/34; B60T 8/40; B60T 13/12; B60T 13/74
See application file for complete search history.

(56) References Cited

U.S. PATENT DOCUMENTS 5,310,251 A * 5/1994 Towers .................. B60T 13/22
                                                                  188/151 A
2016/0130788 A1 * 5/2016 Nee ........................ B60T 13/662
                                                                  701/50

FOREIGN PATENT DOCUMENTS

DE   102004004992 A1   9/2005
DE   102005042282 A1   3/2007
DE   102015225041 A1   6/2017

* cited by examiner

Primary Examiner — Carl C Staubach
Assistant Examiner — Charles J Brauch

(57) ABSTRACT

The disclosure relates to a method for releasing an electro-hydraulic parking brake of a motor vehicle, wherein a vehicle status is determined, in dependence on the vehicle status, a pre-charging pressure demand is determined by a control device, in the event of a pre-charging pressure demand, a hydraulic pre-charging pressure is generated by a pressure generating unit, and in the event of a parking brake release demand, the pre-charging pressure is directed to the electro-hydraulic parking brake.

15 Claims, 2 Drawing Sheets

METHOD FOR A DRIVER ASSISTANCE SYSTEM FOR RELEASING AN ELECTRO-HYDRAULIC PARKING BRAKE

CROSS-REFERENCE TO RELATED APPLICATION

This application claims priority to German Priority Application No. 102022118072.7, filed Jul. 19, 2022, the disclosure of which is incorporated herein by reference in its entirety.

TECHNICAL FIELD

The disclosure relates to a method for releasing an electrically activatable parking brake of a motor vehicle.

BACKGROUND

Electro-hydraulic parking brakes avow the driver to immobilize the motor vehicle in any position by pushing a button inside the vehicle, wherein a friction lining is pressed by a piston against the brake disc. It is, however, also possible to immobilize the vehicle by a signal that is independent of the driver, triggered, for example, by a control device. The electro-hydraulic parking brake combines the mechanisms of action of hydraulic and electromechanical, or electromotive, systems.

In the event of a demand for application of the parking brake, hydraulic fluid under pressure is admitted to the housing, whereby friction linings on the piston press against the brake disc. In a subsequent step, a nut-and-spindle assembly is moved by a parking brake actuator, wherein the spindle nut moves in the direction towards the brake disc and fixes the piston, to which the friction lining is fastened, against the brake disc. Once the hydraulic pressure has been released from the housing and the parking brake actuator is deenergized, the brake lining is held against the brake disc by the self-locking of the nut-and-spindle assembly.

It has been found that advantages can be achieved in the case of parking brakes by superposing hydraulically and electromechanically generated clamping forces. For example, by superposing hydraulically and electromechanically generated forces, the electrical actuator can be dimensioned substantially smaller. Moreover, there are already sufficient driver assistance systems in the motor vehicle that provide a hydraulic pressure, so that no additional components are required in order to be able to apply hydraulic fluid to the parking brake. As a result, both installation space and costs can be saved by applying the parking brake both electromechanically and hydraulically.

Various scenarios are conceivable in the release operation; for example, there are systems which are released only by the electromechanical parking brake actuator, while other systems rely on a hydraulic pressure. The parking brake can here be released simply by hydraulic assistance. Alternatively, the self-locking can also be removed by reversing the rotational direction of the parking brake actuator.

The operation of releasing an electro-hydraulic parking brake provides that a hydraulic pressure is provided, so that the nut-and-spindle assembly is free of force. Then, by operation of the parking brake actuator, the spindle nut is moved away from the piston, whereby the friction lining is pressed against the brake disc only by the hydraulic pressure that is present. By lowering the hydraulic pressure, the friction linings move away from the brake disc and the vehicle is no longer immobilized by the parking brake.

The hydraulic pressure which is necessary for releasing the parking brake requires a build-up of pressure in the event of a release demand. This release demand can be triggered, for example, by the vehicle driver or by a driver assistance system such as the drive away assist (DAA). In current systems, the necessary hydraulic pressure is generated by a pump assembly, wherein this pressure generator can be arranged in different components of the brake controller of the motor vehicle. For example, the pressure generating unit can be arranged in the integrated brake controller (IBC), which, in addition to applying and releasing the parking brake, can initiate and control further braking actions of the motor vehicle. With electric drives in motor vehicles, it is appropriate to supply the electro-hydraulic parking brake with pressure by an electric brake booster (EBB). Unlike conventional vacuum brake boosters, the EBB operates electrically.

A method for releasing an electro-hydraulic parking brake is known, for example, from DE 10 2004 004 992 A1, wherein for operating the brake arrangement of a vehicle comprising an electrically controllable service brake system, adapted to generate brake forces independently of a driver actuation, and comprising an electrically controllable parking brake system, adapted to generate brake forces and maintain these forces, is described.

The prior art has proved successful in principle but has the disadvantage that the pressure generating unit does not become active until the demand for release of the parking brake is made. There is thus a time offset for the driver between the release demand and release of the parking brake. The reason for this is that the pressure generating unit does not build up the hydraulic pressure until the release demand is made, and the nut-and-spindle assembly also does not move away from the friction linings until the release demand is made. This is noticeable to the driver for example when using driver assistance systems, such as drive away assist in a traffic jam. The delayed release of the electro-hydraulic parking brake can in some circumstances lead to confusion for the driver of the vehicle, because he expects the parking brake to be released immediately.

What is needed is a method for releasing an electro-hydraulic parking brake in which the release operation takes place in a more user-friendly manner and more quickly.

SUMMARY

A method according to the disclosure proposes determining a vehicle status, wherein, in dependence on the vehicle status, a control device determines a pre-charging pressure demand and, in the event of a pre-charging pressure demand, a pressure generating unit generates a hydraulic pre-charging pressure, wherein, in the event of a parking brake release demand, the pre-charging pressure is directed to the electro-hydraulic parking brake.

An aspect of the disclosure is accordingly to release the parking brake more quickly by determining a vehicle status and generating a hydraulic pre-charging pressure. In one exemplary arrangement, the vehicle status comprises a driver presence state, which can be determined by vehicle sensors, calculation methods or other methods. For determining the driver presence state, the seat occupancy or the state of the ignition switch or of the seat belt buckle can be evaluated, for example. For example, it can be assumed on closing of the seat belt buckle that imminent release of the parking brake can be expected. The vehicle status determined from the driver presence state indicates that there is the prospect of the parking brake soon being released.

The vehicle status can also comprise a vehicle state, wherein the vehicle state can be determined by vehicle sensors. If the motor vehicle has sensors for sensing the environment, such as a camera, lidar or radar, the vehicle status can be determined by those sensors. If, for example, the vehicle detects traffic lights which change from a stop signal to a go signal, this can lead, as a result of the changed vehicle state, to a pre-charging pressure demand. Distance information to vehicles in the vicinity can also lead to a pre-charging pressure demand, for example in the case of a traffic jam that is dispersing. In addition, the vehicle status can describe a condition of the vehicle, for example the vehicle inclination, load or performance. A vehicle state can also comprise standstill detection, which for this purpose can access, for example, the wheel speed sensors that are present in the vehicle. Standstill detection by other systems, such as the global positioning system (GPS), is also possible.

The determined vehicle status causes a control device to determine a pre-charging pressure demand. The control device can be an additional control device, or the method according to the disclosure can be implemented in a control device that is already present, such as the brake control device. In the event of a pre-charging pressure demand, the pressure generating unit generates a hydraulic pre-charging pressure, wherein the pump mounted in the pressure generating unit does not necessarily have to be operated for this purpose. For example, it is conceivable that a hydraulic pressure is "confined". The hydraulic pressure confined in the brake controller can also be confined in a low pressure accumulator (LPA). In addition, it is conceivable that the pressure generating unit provides the pre-charging pressure by briefly starting up the hydraulic pump and "confines" it by a valve assembly. A crucial factor for the method according to the disclosure is that the pre-charging pressure is blocked from the electro-hydraulic parking brake by at least one valve.

If a parking brake release demand is made, the pre-charging pressure is directed to the parking brake. Due to the pre-charging pressure prevailing in the brake controller, rapid release of the electro-hydraulic parking brake is ensured, because the pressure is immediately present at the parking brake when the valve is opened. The pre-charging pressure can be such that it is sufficient to release the parking brake fully. It is also possible that, if the pre-charging pressure is too low, the pump of the pressure generating unit starts up after the pre-charging pressure has reduced and additionally assists with the operation of releasing the parking brake. In both cases, the operation of releasing the parking brake in any case takes place more quickly compared to the prior art.

A further exemplary arrangement of the disclosure provides that the vehicle status also comprises a clutch state, for example an actuation path and/or an actuation speed and/or actuation force of the vehicle clutch. Thus, in the case of vehicles with a manual transmission, it can be deduced from the clutch state that the motor vehicle is soon to set off. For example, a depressed clutch pedal and/or the release of the clutch pedal when in gear suggests that the driver of the vehicle intends to set off within a short time. It is particularly appropriate to determine the vehicle status on the basis of an actuation speed of the clutch pedal, because rapid release of the clutch when in gear initiates a drive away operation, which requires the release of the parking brake. The method according to the disclosure is useful in such situations because, when the motor vehicle driver wishes to drive away, rapid release of the parking brake is desirable.

According to a further exemplary arrangement, the method according to the disclosure provides that the vehicle status comprises a transmission state, for example an actuation position of a gear lever and/or of a selector lever of the vehicle transmission. For example, in the case of a vehicle with automatic transmission, actuation of the selector lever from "P" (park) to "D" (drive) suggests that the vehicle will shortly leave its rest state and a parking brake release demand will be present. In addition, further sensors indicating a vehicle state are known to a person skilled in the art, such as, for example, the release of a drive away assist or other driver assistance systems.

It is further provided that the pressure generating unit generates the pre-charging pressure until the electro-hydraulic parking brake is mechanically released. The provision of the pre-charging pressure within the brake controller can be generated in different ways. For example, it is conceivable that the pre-charging pressure is confined in a low pressure accumulator and in a connected valve assembly. The hydraulic pressure can also be provided in the pressure generating unit by an ABS or ESP pump, wherein it is provided in one exemplary arrangement that the pump starts up for only a short time and the resulting pressure is intermediately stored within the brake controller by a valve assembly. There can be provided for this purpose a pressure sensor which continuously measures the confined hydraulic pressure and, if it falls below a limit value, causes pressure to be built up again. It is thus ensured that, in the event of a release demand, the predetermined hydraulic pressure is always directed to the electro-hydraulic parking brake.

It is provided that the pressure generating unit is part of a vehicle stability control system, for example part of an antilock brake system (ABS) and/or electronic stability programme (ESP). Vehicle stability control systems in most cases have pressure generating units and are therefore useful for implementing a pre-charging pressure demand. Such systems can also confine or intermediately store the hydraulic pressure, so that no additional hydraulic components are required. The prevalence of vehicle stability control systems in motor vehicles allows such systems to be used across all vehicle classes and saves installation space by the omission of an additional pressure generating unit.

A further exemplary arrangement provides that the pre-charging pressure includes a service brake pressure. The service brake pressure is a hydraulic pressure which is directed to the brake calipers during service braking and thereby slows the vehicle down or holds it stationary. The service brake pressure can be provided by a conventional vacuum brake booster or an electric brake booster. Advantages arise in this exemplary arrangement as a result of the fact that a unit for service brake pressure generation is already implemented in most vehicles and thus no further components are required for the method according to the disclosure. The device for the service brake pressure likewise has a valve assembly, whereby a pre-charging pressure can be confined. It is advantageous that the pump for providing the service brake pressure is dimensioned larger than the pump for driver assistance systems, because the service brake pressure is demanded more frequently than that of a driver assistance system. It is thus conceivable that the service brake pressure is kept constantly available and is not intermediately stored by a valve assembly.

It is particularly advantageous when using the service brake pressure that such systems are already present in a motor vehicle and in some cases no longer have a mechanical action, for example, for those systems that are in the form of brake-by-wire systems.

The disclosure is directed further to a parking brake system which comprises an electro-hydraulic parking brake, a control device and a pressure generating unit. The control device is adapted to determine a vehicle status and to carry out the steps of the method according to the disclosure.

The disclosure relates further to a program code with commands which, when carried out by the control device, cause the parking brake system described above to carry out the method which has likewise been described.

BRIEF DESCRIPTION OF DRAWINGS

Further features, advantages and characteristics of the disclosure will be explained by the description of exemplary arrangements of the disclosure, with reference to the figures, in which.

DETAILED DESCRIPTION

Figure 1:
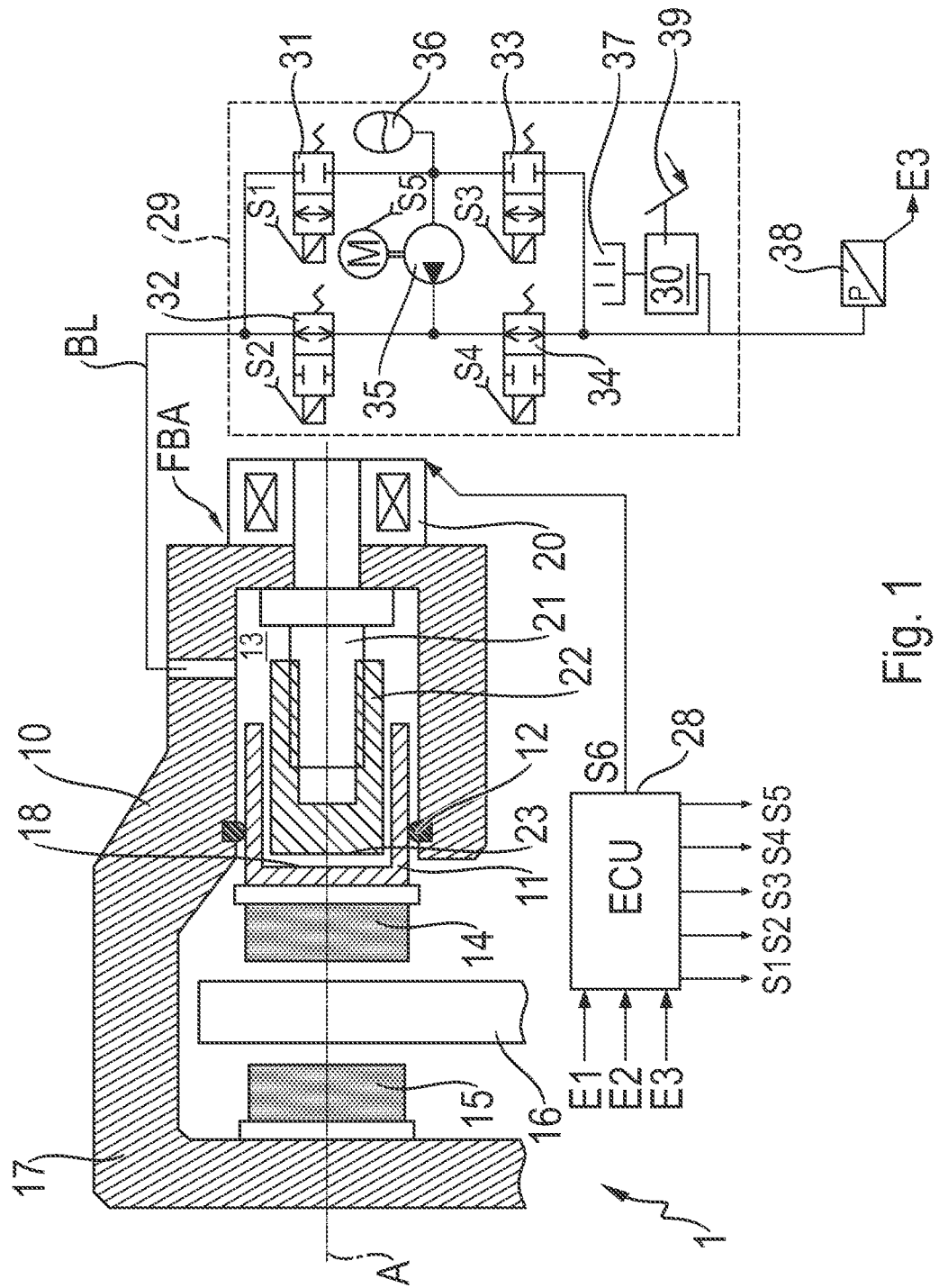
FIG. 1: shows an exemplary arrangement of an electro-hydraulic parking brake with a pressure generating unit connected thereto.

FIG. 1 shows an electro-hydraulic parking brake 1 with a hydraulically connected pressure generating unit 29, and a control device 28. The electro-hydraulic parking brake 1 comprises a housing 10 and brake calipers 17, wherein a first friction lining 15 is fastened to the brake caliper 17. The electro-hydraulic parking brake 1 additionally has a hydraulic connection for the pressure generating unit 29 and a mechanical interface with the parking brake actuator 20.

Arranged opposite the first friction lining 15 is a second friction lining 14, which can be fastened to an axially displaceable brake piston 11. The parking brake actuator 20 drives a spindle 21, which is in contact with a spindle nut 22, which in turn is fastened to an actuating element 23. The spindle nut 22 is fixed relative to the spindle 21, so that the spindle nut 22, on rotation of the spindle 21, moves in the direction towards the brake disc 16. The movement of the spindle nut 22 in the direction towards the brake disc 16 causes the actuating element 23 to press against the piston base 18 of the brake piston 11. By further rotation of the spindle nut 22, the second friction lining 14 can thus be brought into contact with the brake disc 16. The actuating element 23 and the piston base 18 of the brake piston 11 are arranged coaxially to one another on the axis A and can be displaced independently of each other.

Between the piston base 18, the housing 10 and the spindle assembly 21 there is a hydraulic chamber 13, into which brake fluid from the pressure generating unit 29 can pass. The increasing pressure in the hydraulic chamber 13 causes the piston base 18 to be pressed in the direction towards the brake disc 16, whereby the brake lining like brake lining 14 is pressed against the brake disc 16. The hydraulic chamber 13 is sealed with respect to the housing 10 by a fluid seal 12.

On application of the electro-hydraulic parking brake 1, pressure is generated in the hydraulic chamber 13 by the pressure generating unit 29, and the brake disc 16 is slowed down by the applied friction linings. The parking brake actuator 20 is then activated and, by way of the spindle nut 22, the actuating element 23 is pressed against the piston base 18, whereby a superposition of hydraulic and mechanical forces is obtained at the friction lining 14. Due to the superposition of these two forces, it is possible to dimension the parking brake actuator 20 so that it is smaller compared to an electromechanical parking brake (EPB).

Once the brake disc 16 is immobilized, the pressure in the hydraulic chamber 13 is reduced and the parking brake actuator 20 is also deenergized. Due to the self-locking action between the spindle nut 22 and the spindle 21, the brake piston 11 can no longer move away from the brake disc 16. It is thus ensured that, in the event of a failure of the system, the parking brake remains active at all times and effectively prevents the vehicle from rolling away.

Alternatively, the electro-hydraulic parking brake 1 can be released by admitting hydraulic pressure to the fluid chamber 13 again, since the force of the parking brake actuator 20 alone is not sufficient to overcome the clamping forces in order to release the brake. Once brake fluid has been admitted to the hydraulic chamber 13 and slight application to the brake disc 16 has taken place, the polarity of the parking brake actuator 20 can be reversed and the spindle nut 22 can be removed from the brake piston base 18. The hydraulic pressure in the hydraulic chamber 13 is then reduced and the friction linings 14, 15 move away from the brake disc 16 and the brake disc 16 is no longer immobilized.

The pressure generating unit 29 is shown on the right in FIG. 1 and is connected via a hydraulic line BL to the electro-hydraulic parking brake 1. During normal service braking, the driver of the motor vehicle exerts pressure on a brake pressure transmission unit 30 by way of a brake pedal 39, whereupon the brake pressure transmission unit generates a hydraulic pressure. The brake pressure transmission unit 30 can be supplied with fluid from a fluid reservoir 37. The fluid pressure generated by the brake pressure transmission unit 30 is determined by a pressure sensor 38 and can be used to activate an electric brake booster.

In the case of braking which does not require ABS control, the fluid pressure generated by the brake pressure transmission unit 30 is delivered via the check valve 34 and a further check valve 32 to the electromechanical parking brake 1. In the electromechanical parking brake 1, the fluid flowing into the fluid chamber 13 can also be used to carry out service braking.

If a driver assistance system detects a situation which requires the service brake at the wheel in question to be released, the check valve 32 switches over, so that fluid can no longer flow through the valve, and the gate valve 31 is set to transmit, whereby the fluid stream is able to flow from the hydraulic chamber 13 into the low pressure accumulator 36. The low pressure accumulator (LPA) is configured to intermediately store a fluid pressure. Once the pressure in the hydraulic chamber 13 has reduced, the valves 32, 31 can switch back into their original position and, by a fluid pump 35 with a connected motor, a fluid pressure is built up and is again introduced into the fluid chamber 13. If the activated wheel locks again, the valves 31, 32 are switched over again and the cycle begins again.

In the case of motor vehicles which have an electromotive drive in addition to a combustion engine drive, so-called regenerative braking has in principle proved its worth because fuel consumption can thereby be reduced considerably. The majority of the braking power is here applied by the electric drive machine and not the friction brake. In order to make regenerative braking possible and nevertheless give the vehicle driver the feel of a conventional hydraulic brake, it is possible to intermediately store the pressure generated by the brake pressure transmission unit 30 in the low pressure accumulator 36. The valves are correspondingly controlled for this purpose during braking and allow a counter-pressure to be generated at the brake pedal 39.

The valve assembly 31, 32, 33, 34, the fluid pump 35 and the parking brake actuator are connected to the control device 28 and are configured to be activated thereby. The connection between the control device 28 and the connected components can be wired or wireless, wherein the control device 28 can also be implemented in a control device that is already present in the vehicle, such as a brake and/or steering and/or drive control device.

If a pre-charging pressure demand passes from the control device 28 to the pressure generating unit 29, a hydraulic pre-charging pressure is generated. According to a first exemplary arrangement, it is provided for this purpose that the check valve 32 and the check valve 34 change from the transmitting position shown into a blocking position. The gate valves 31, 33, on the other hand, remain in their original blocking position. The hydraulic volume between the valves 31, 32, 33, 34 is accordingly confined, and the fluid pump 35 is driven by a motor, whereby a fluid pressure is established within the valve assembly 32, 34. The confined fluid pressure can be intermediately stored for a certain period of time and can be detected by a pressure sensor (not shown), wherein, if the pressure falls below a predefined minimum pressure, the fluid pump 35 is activated in order to achieve a build-up of hydraulic pressure.

The fluid volume required for the pressure build-up can also be taken from the low pressure accumulator 36 or from another source and confined by the valve assembly 31, 32, 33, 34.

If the demand for release of the parking brake 1 is made, the check valve 32 switches from its blocking position into the transmitting position, whereby hydraulic fluid passes into the hydraulic chamber 13 and the parking brake 1 is released. The confined hydraulic pressure is such that it is sufficient to release the parking brake. If that is not the case, for example due to leakage, it is possible to activate the fluid pump 35 and generate a pressure build-up again. In any case, the pre-charging pressure is sufficient to release the electro-hydraulic parking brake 1 at least partially.

A further example provides that the hydraulic pressure is intermediately stored in the valve assembly 31, 32, 33, 34, wherein activation of the fluid pump 35 is not necessary for this purpose since the pre-charging pressure is intermediately stored in the low pressure accumulator 36. It is necessary for this purpose that the low pressure accumulator 36 is correspondingly filled and is able to build up a certain minimum pressure. After the demand for release of the parking brake has been received, the gate valve 31 switches from its blocking position into the transmitting position, whereby hydraulic fluid is able to pass from the low pressure accumulator 36 into the hydraulic chamber 13.

In both exemplary arrangements, the release of the parking brake by the intermediately stored pre-charging pressure takes place more quickly than in the prior art.

Figure 2:
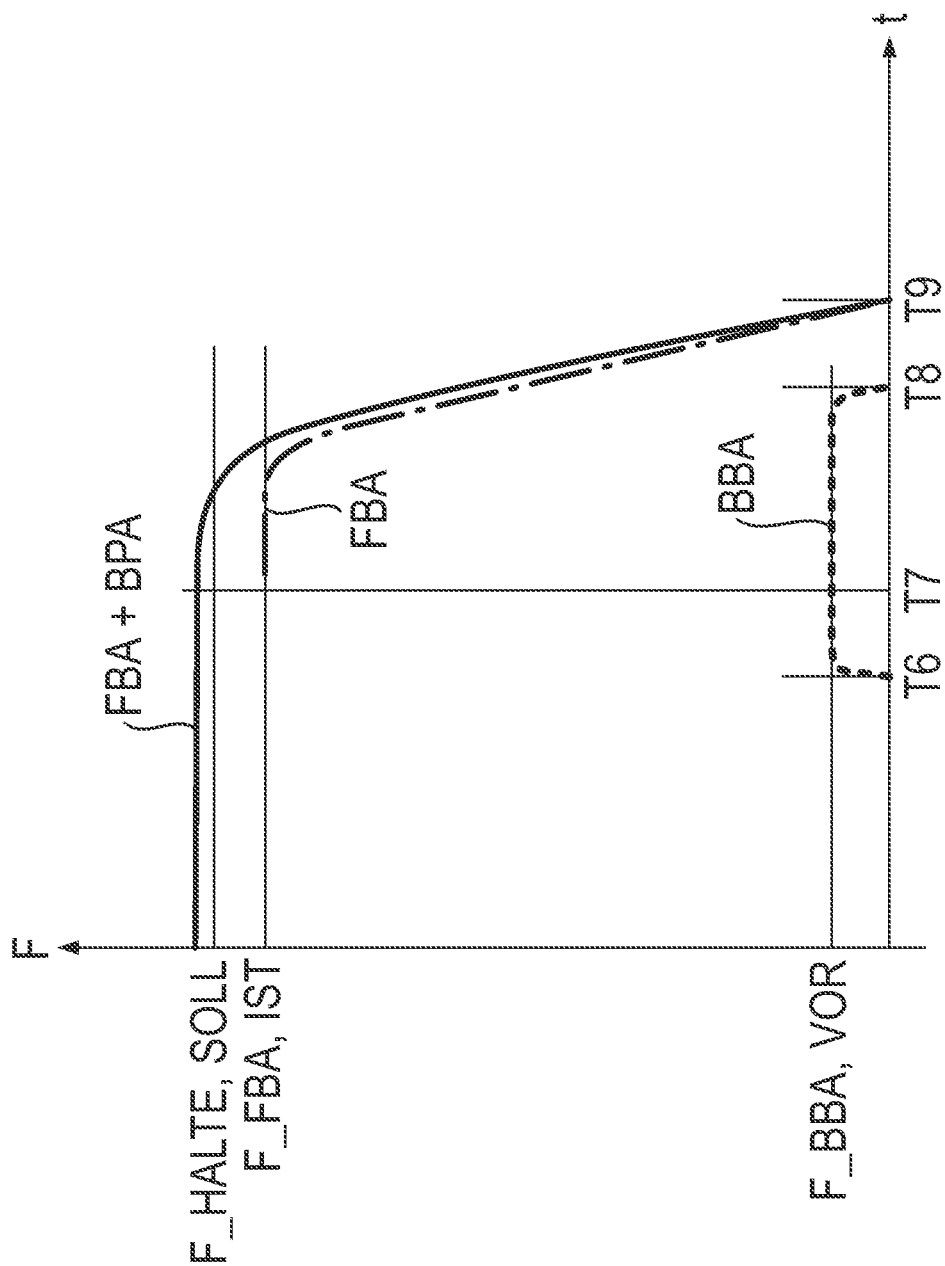
FIG. 2: shows a force/time diagram of the method according to the disclosure on release of the parking brake.

FIG. 2 shows a force/time diagram of the method according to the disclosure on release of the parking brake system, wherein the time is shown on the x-axis and the clamping force on the y-axis. The clamping force when the parking brake is applied is composed of the clamping forces applied by way of the service brake system (BBA) and the parking brake system (FBA) and is described in FIG. 2 as F_HALTE,SOLL.

At time T6, a pre-charging pressure demand is present, whereby the pressure generating unit 29 generates a hydraulic pre-charging pressure, and is designated F_BBA,VOR in FIG. 2. The trigger for the pre-charging pressure demand can be depression of the clutch pedal. The hydraulic pre-charging pressure that is generated is intermediately stored until a demand for release of the parking brake 1 is present, as is the case at time T7. As already outlined above, in such a case the valve assembly is switched such that the pre-charging pressure passes into the hydraulic chamber 13. It can likewise be provided that the electrical components of the electro-hydraulic parking brake 1 are energized and the spindle-nut assembly is released.

In the case shown in FIG. 2, the hydraulic pre-charging pressure is present until time T8 and then falls to 0. The time at which the hydraulic pre-charging pressure fails depends, inter alia, on the size of the hydraulic brake circuit and is also dependent on whether the fluid pump 35 has subsequently been switched on or not. The pressure generating unit 29 can also be allowed to run until time T9. If the hydraulic pre-charging pressure were to be kept available for longer than until time T9, the parking brake would be applied and the brake disc 16 would remain clamped.

Isolated features can, if required, also be extracted from the feature combinations disclosed herein and used, with the dissolution of any structural and/or functional connection which may exist between the features, in combination with other features in order to delimit the claimed subject matter. The order and/or number of steps of the methods can be varied. The methods can be combined with one another, for example to form an overall method.

The invention claimed is:

1. A method for releasing an electro-hydraulic parking brake of a motor vehicle, wherein:
   a vehicle status is determined;
   in dependence on the vehicle status, a pre-charging pressure demand is determined by a control device;
   in the event of a pre-charging pressure demand, a hydraulic pre-charging pressure is generated by a pressure generating unit and a hydraulic volume is confined within the pressure generating unit by a plurality of valves;
   in the event of a parking brake release demand, the pre-charging pressure is released from confinement within the pressure generating unit and directed to a hydraulic chamber of the electro-hydraulic parking brake.

2. The method according to claim 1, wherein the vehicle status comprises a driver presence state and/or a vehicle state.

3. The method according to claim 1, wherein the vehicle status comprises an actuation path and/or an actuation speed and/or an actuation force of a vehicle clutch.

4. The method according to claim 1, wherein the vehicle status comprises an actuation position of a gear lever and/or of a selector lever of a vehicle transmission.

5. The method according to claim 1, wherein the pressure generating unit generates the pre-charging pressure until the electro-hydraulic parking brake is mechanically released.

6. The method according to claim 1, wherein the pressure generating unit blocks the generated pre-charging pressure by a valve assembly.

7. The method according to claim 1, wherein the pressure generating unit is part of a vehicle stability control system.

8. The method according to claim 1, wherein the pre-charging pressure includes a service brake pressure.

9. A parking brake system comprising an electro-hydraulic parking brake, a control device and a pressure generating unit, wherein the control device is adapted to determine a vehicle status and to carry out the steps of the method according to claim 1.

10. A program code comprising commands which, when carried out by a control device, cause a parking brake system, which has an electrohydraulic parking brake, the control device and a pressure generating unit, wherein the control device is adapted to determine a vehicle status and to carry out the method according to claim 1.

11. The method according to claim 2, wherein the vehicle status comprises an actuation path and/or an actuation speed and/or an actuation force of the vehicle clutch.

12. The method according to claim 11, wherein the vehicle status comprises an actuation position of a gear lever and/or of a selector lever of the vehicle transmission.

13. The method according to claim 12, wherein the pressure generating unit generates the pre-charging pressure until the electro-hydraulic parking brake is mechanically released.

14. The method according to claim 13, wherein the pressure generating unit blocks the generated pre-charging pressure by a valve assembly.

15. The method according to claim 14, wherein the pressure generating unit is part of an antilock brake system and/or electronic stability programme.

\* \* \* \* \*